United States Patent [19]

Cosgrove

[11] 3,985,858
[45] *Oct. 12, 1976

[54] TREATMENT OF ZINC HYDROXIDE SLURRY AND RECOVERY OF ZINC-CONTAINING PRODUCT THEREFROM

[75] Inventor: John H. Cosgrove, Media, Pa.

[73] Assignee: FMC Corporation, Philadelphia, Pa.

[ * ] Notice: The portion of the term of this patent subsequent to May 27, 1992, has been disclaimed.

[22] Filed: Apr. 8, 1975

[21] Appl. No.: 566,646

Related U.S. Application Data

[63] Continuation-in-part of Ser. No. 159,441, July 2, 1971, Pat. No. 3,886,258.

[52] U.S. Cl. ............................. 423/106; 423/101; 423/544; 423/622; 423/632
[51] Int. Cl.² .................... C01G 9/02; C01G 9/06
[58] Field of Search ........... 423/622, 544, 106, 101, 423/102, 632

[56] References Cited
UNITED STATES PATENTS

| | | | |
|---|---|---|---|
| 2,991,884 | 7/1961 | Shackmann | 423/592 X |
| 3,674,476 | 7/1972 | Tamai et al. | 423/622 X |
| 3,886,258 | 5/1975 | Cosgrave | 423/106 |

FOREIGN PATENTS OR APPLICATIONS

| | | | |
|---|---|---|---|
| 1,086,856 | 8/1960 | Germany | |
| 204,322 | 10/1924 | United Kingdom | |
| 838,851 | 6/1960 | United Kingdom | |
| 678,462 | 9/1952 | United Kingdom | 423/622 |

Primary Examiner—Edward Stern

[57] ABSTRACT

A dilute aqueous slurry of hydrated zinc oxide is subjected to heat and pressure to obtain solids having improved filtering characteristics. The process is especially useful in the treatment of neutralized waste liquor from the viscose rayon system to provide a more economical method for the recovery of zinc sulfate.

15 Claims, 1 Drawing Figure

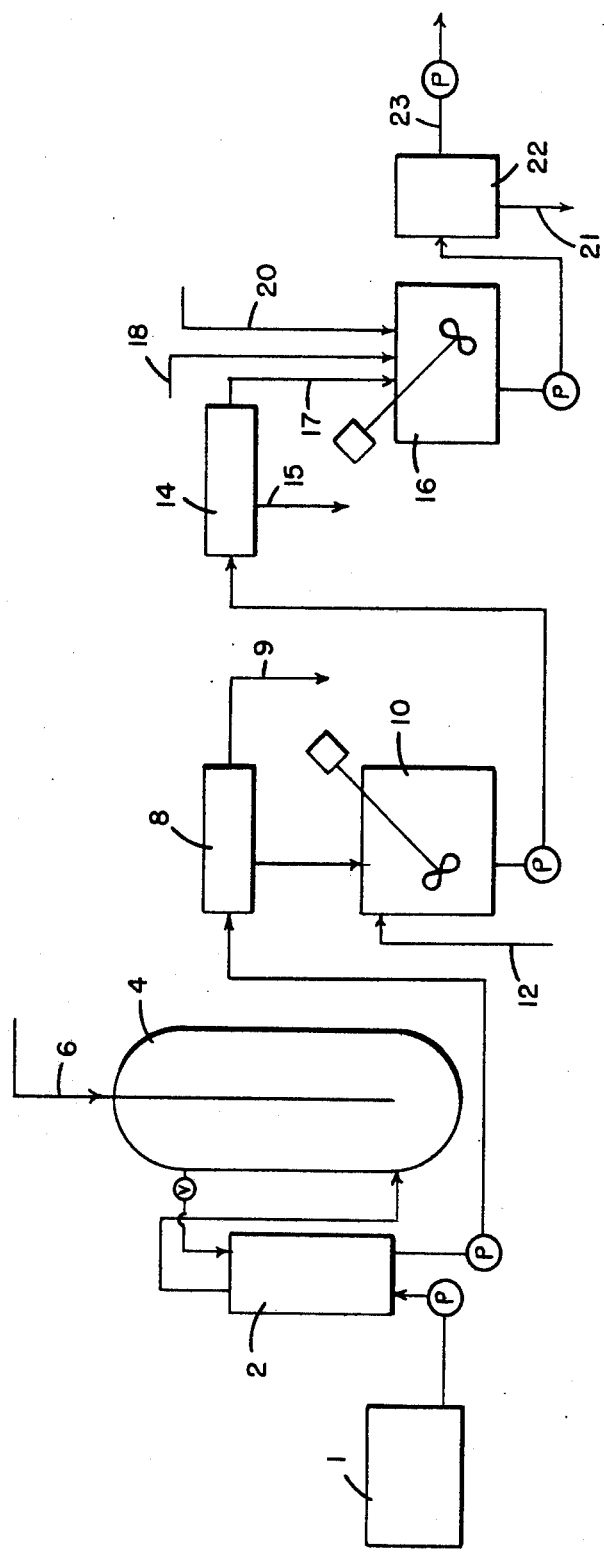

TREATMENT OF ZINC HYDROXIDE SLURRY AND RECOVERY OF ZINC-CONTAINING PRODUCT THEREFROM

CROSS REFERENCE TO RELATED APPLICATIONS

This is a continuation-in-part of my copending application Ser. No. 159,441, filed July 2, 1971 now U.S. Pat. No. 3,886,258.

This application relates to recovery of zinc values from a dilute aqueous slurry of hydrated zinc oxide by heat treatment of said slurry.

It is known to recover zinc hydroxide or hydrated zinc oxide by filtration of a dilute slurry thereof. The recovery of zinc from viscose spinning baths and processing liquors is taught, for example, in British Pat. No. 678,462 and U.S. Pat. No. 3,380,804. The former patent discloses the addition of either a combination of lime and caustic soda to waste viscose processing liquor to first neutralize the acid and then precipitate the zinc as zinc hydroxide or the use of caustic soda alone for this purpose. The temperature employed is above 60° C. although 90° C. is the highest temperature mentioned in the specification. The latter patent discloses a process of cation exchange to recover zinc from the viscose process liquor.

Other methods for recovering zinc from waste slurries include drying with calcining, chemical extraction, pressing and electrolytic separation.

The above methods are presently considered to be too expensive for use in the competitive rayon industry, however, it has become imperative that such waste material be reprocessed to prevent overflow of neutralized waste stored in field basins into rivers, streams and underground water.

It is a primary object of this invention to provide an economically feasible system for recovery of a more useful zinc product from a dilute aqueous slurry of hydrated zinc oxide.

It is another object of this invention to provide a method wherein a slurry containing flocculant hydrated zinc oxide is treated to produce a change in filtration characteristics of the zinc oxide whereby the solids retain less water on recovery.

These and other objects are accomplished in accordance with this invention by elevating the temperature of a dilute aqueous slurry of hydrated zinc oxide to at least about 257° F. under an elevated pressure sufficient to prevent loss of water from the slurry for a time sufficient to decrease the water of hydration content of the hydrated zinc oxide in the slurry but no less than about 5 minutes, and then recovering the filterable solids.

The minimum temperature of about 257° F. is required in order to obtain a decrease in water of hydration content of the hydrated zinc oxide in the slurry. It is preferred from the standpoint of optimum results in the plant, that the slurry temperature be maintained from about 325° to 350° F. for a time period of about 10 minutes. This is most practically accomplished by injecting steam into the slurry contained in a pressure vessel. However, other means of heating the slurry in a pressure vessel can be employed.

The minimum time of treatment of at least 5 minutes is dictated by the limitations of conventional pressure systems which require time for injecting heat or steam, treatment time and time for relieving pressure on the system. In general, optimum treatment time of the slurry, as stated above, is about 10 minutes when the temperature range is at its optimum.

The term — "elevated pressure sufficient to prevent loss of water from the slurry" — is meant to include processes wherein some water is allowed to escape the pressurized system which is maintained at least at the minimum prescribed temperature. However, sufficient water much remain to act as a solvent for water-soluble impurities in the system above that held by the zinc oxide during filtration.

The process of this invention is advantageously employed in the recovery of useful zinc sulfate solution from waste treatment liquor from the viscose rayon process. Waste liquor from the viscose rayon process usually contains sulfuric acid, sodium sulfate, small amounts of zinc sulfate and impurities which are picked up from contact with processing machinery. The collected waste liquor is treated with sufficient lime [Ca(OH)$_2$] to neutralize the acid and convert the zinc sulfate to zinc hydroxide. Alternatively, lime and caustic soda can be used as taught in British Pat. No. 678,462 to neutralize and raise the pH of the slurry. The zinc hydrate slurry is passed through a clarifier where the sludge settles out and the substantially clear effluent is passed to waste.

As shown in the drawing, the sludge from the clarifier 1 can be passed directly to the treatment apparatus in accordance with the process of this invention or passed to fluid basins for later processing.

In any event, the slurry containing from about 1 to about 10 percent, preferably 1 to 4 percent, solids of which a predominant amount is zinc hydroxide, usually about 40–60 wt.%, is first preferably preheated by passing it through a heat exchanger 2 and then to the heated pressure vessel 4 into which superheated steam is injected at 6. After the required residence time in vessel 4, the sludge is passed back through the heat exchanger 2 and then through a pressure filter 8. The filter cake from filter 8 is transferred to an acid mixing tank 10 into which sulfuric acid flows through conduit 12. The filtrate from filter 8 is removed through line 9. A solution of zinc sulfate containing calcium sulfate, organics (from cellulose) and ferrous sulfate is formed and pumped to pressure filter 14 wherein the filter cake is dumped as waste through 15 and the filtrate passed to mixing vessel 16 through line 17. An oxidizing agent, for example, hydrogen peroxide and a pH adjuster, for example, sodium hydroxide enter the mixing vessel through lines 18 and 20, respectively. After mixing, the sulfate solution containing filterable ferric hydroxide is pumped to vacuum filter 22 and the iron precipitate removed through 21. The recovered zinc sulfate solution may now be pumped through line 23 to a holding tank or directly to viscose processing baths. The above process has been described with a minimum of steps and it will be realized that the process can be carried out using additional apparatus and steps. For example, holding or surge tanks can be interposed between each processing unit and slurries and solutions can be recycled to obtain higher yields and greater product purity.

Advantageously, the inclusion of the step of heating the hydrate slurry under pressure provides a zinc oxide of changed filtration characteristics whereby the filtered solids contain much less water. This permits the removal of much more of the water-soluble impurities during filtration. Furthermore, in order to obtain a zinc sulfate solution of the desired concentration by the addition of sulfuric acid to the filter cake, little or no heat energy is needed to boil off excess water. Thus, this step is required to provide an economical process.

The following examples will demonstrate the method of this invention.

EXAMPLE I

Lime neutralized viscose rayon process liquor in the form of a sludge containing about 4 percent flocculant solids of which about 50 percent is zinc hydroxide is heated in a 2 gallon pressure reactor by direct injection of steam at various temperatures and time without loss of sludge liquid. At the end of each treatment, the pressure is released to atmospheric over a time period of approximately ten minutes. The treated sludge is cooled and then vacuum filtered in the laboratory. Filtration is continued past the point at which the cake cracked and stopped when no additional cracking is apparent.

The effect of temperature and residence time on the filtration characteristics of the treated sludge is shown in the following table:

TABLE

| Steam Temp. °F. | Time, min. | % Solids* |
|---|---|---|
| Ambient (No steam treatment) | — | 7.7 |
| 280 (35 p.s.i.g.) | 240 | 28.0 |
| 298 (50 p.s.i.g.) | 45 | 10.6 |
| 320 (75 p.s.i.g.) | 10 | 14 – 14.5 |
| '' | 20 | 14.5 – 16 |
| '' | 30 | 21 – 26 |
| '' | 45 | 31.5 – 32.5 |
| 338 (100 p.s.i.g.) | 10 | 21 – 21.5 |
| '' | 20 | 26.5 – 27.5 |
| '' | 30 | 37.5 |
| '' | 40 | 35 |
| 353 (125 p.s.i.g.) | 10 | 35.5 |
| '' | 20 | 34.5 |
| '' | 30 | 33.5 – 36.5 |
| '' | 45 | 34 – 34.5 |

*Based on weight of filter cake

EXAMPLE II

Waste viscose rayon processing liquor is neutralized with sufficient lime $[Ca(OH)_2]$ to convert the zinc sulfate to zinc hydroxide. The resulting slurry is passed to a clarifier unit and the sludge from this unit contains 1–2 percent flocculant solids of which about 50 percent by weight is zinc hydroxide. This is continuously pumped to a surge tank and then through a heat exchanger to preheat it. The sludge is then pumped into a pressure treatment vessel wherein it is subject to steam at 150 p.s.i.g. (366°F.) for a residence time of 10 minutes. The sludge temperature reaches about 340°F. The sludge is pumped through the heat exchanger to transfer heat to incoming sludge andd then to a surge tank from which it is pumped to a pressure filter wherein most of the filterable solids are removed. The effluent from the pressure filter may be recycled or run out as waste while the filtered solids are deposited in an acid reactor having mechanical agitating means. Sufficient sulfuric acid at the required concentration is piped into the acid reactor to provide a zinc sulfate solution at a concentration of 30 percent. The solution is then pumped to a surge tank and from there to a pressure filter. The filtered solids from the filter containing some residual zinc sulfate may be periodically repulped by passing it back to another mixing tank which provides a solution slurry which is returned to the pressure filter. Eventually, the solids such as calcium sulfate and organics are dumped as waste.

To remove iron which is detrimental to the viscose process, the filtrate from the pressure filter is passed to a solution mixing tank and sufficient sodium hydroxide and hydrogen peroxide are added to convert the ferrous salt to ferric hydroxide. The pH of the solution is raised to 5 by the addition of the sodium hydroxide. The residence time in the solution mixing tank is sufficient to permit substantially all of the iron oxide to coagulate into filterable particles. This solution is then passed to a rotary vacuum filter wherein the iron content of the solution is brought down to the desired amount, e.g., about 100 p.p.m. The zinc sulfate solution is now ready for reuse in a viscose rayon process.

A steam temperature of between about 350° and about 370°F. or steam under pressure of about 125 p.s.i.g. to about 150 p.s.i.g. is advantageously employed for the preferred time period to heat the slurry between 325° and 350°F.

As stated in the 1258 Patent, the heat treatment of this invention results in a decrease in the water of hydration content of the hydrated zinc oxide. One convenient way to follow this decrease analytically is by X-ray diffraction analysis of the slurry, itself, before and after heat treament. This is illustrated in Example III below.

EXAMPLE III

In this Example the starting sludge material was taken from a sludge pond (of a rayon factor) where it had accumulated over an extended period.

An aliquot of this untreated sludge was analyzed by first filtering it (200 ml of sludge yielded 10.9 grams of filter cake) and then drying the filter cake in an oven at 105° (the 10.9 grams of undried cake yielded 1.2 grams of dry solids, i.e., the solids content of the filter cake was 11%) and analyzing the resulting dry solids for Zn and Ca (33.4% Zn and 3.6% Ca).

Another aliquot of the untreated sludge was heat treated at 170° C. for 20 minutes in a stainless steel pressure bomb, cooled slowly and filtered. The filter cake had a solids content of about 35% solids; the dried solids thereof had a Zn content of 39.6% and a Ca content of 3.5%.

Wet sludge solids were examined by X-ray diffraction before and after heat treatment. For the material before heat treatment the X-ray spectra revealed the presence of high concentrations of noncrystalline component(s). This was suggested from the broad, diffuse, amorphous intense scattering extending from the region of 1.6A to about 6A. The observed crystalline components were mainly calcium sulfate dihydrate $(CaSO_4.2H_2O)$ and small amounts of crystalline zinc hydroxide $(Zn(OH)_2)$. For the material after heat treatment the spectra revealed the presence of crystalline zinc oxide (ZnO), crystalline calcium sulfate dihydrate $(CaSO_4. 2H_2O)$, and crystalline zinc hydroxide $(Zn(OH)_2)$. The concentrations of zinc oxide and calcium sulfate dihydrate were relatively higher than that of zinc hydroxide. The observed concentration of the noncrystalline components was lower than that observed in the sample before heat treatment.

The spectra were obtained with a "Norelco" powder X-ray diffraction unit, model XRG3000 operated with copper K alpha radiation using a curved crystal monochrometer, at 50 KV, 20 milliamperes, 1° slit width, solid state scintillation detector feeding to a count rate meter, scanned at 1° per minute. The crystalline components were identified by comparison of the experimentally observed X-ray diffraction peaks and their relative intensities with standard spectral data reported by the Joint Committee on Powder Diffraction Standards.

In the description of the process in application Ser. No. 159,441 it will be seen that calcium sulfate is present during process. Thus in its Example II calcium sulfate solids and organic solids are filtered off from the zinc sulfate solution and dumped as waste. The process is operative when calcium compounds (such as calcium sulfate and calcium carbonate) are present in the sludge before, during and after the heat treatment. In fact the process has been found to have its greatest utility when such compounds are present (as they are, conventionally, in zinc hydroxide sludges made by precipitation with lime) in that, unlike the process described in German patent 1,086,856, the process does not require the expensive steps of diluting with large amounts of very soft water, operating in the larger equipment (needed because of such dilution), and then disposing of correspondingly large amounts of the dilution water. As mentioned earlier, the $Zn(OH)_2$ content of the sludge solids is usually in the range of about 40–60 wt.%, with other ingredients making up the balance of the solids. Two typical, very approximate analyses of the insoluble solids of the starting sludge are, for example: (a) 57% $Zn(OH)_2$ (on drying at 110°C. for about 16 hours), 9% $Zn S$ (assuming all sulfide is present as $Zn S$), 1% $Fe(OH)_2$, 7% $CaSO_4 2H_2O$, 16% cellulose, 4% total of $Al_2O_3$, $SiO_2$, $MgO$; (b) 38% $Zn(OH)_2$, 9% $Zn S$, 1% $Fe(OH)_2$, 38% $CaSO_4.2H_2O$, 12% cellulose, 3% total of $Al_2O_3$, $SiO_2$ $MgO$. These analyses are on samples taken from various sludge basins or lagoons containing sludge stored over many years from a rayon plant. The zinc and calcium contents in the insoluble solids in such lagoons ranged from about 44% Zn and 1.5% Ca in one sample to about 31% Zn and 9% Ca in another. The average solids concentration in those lagoon sludges varied with the depth at which the sample was taken, some samples having 3% solids and others almost 7% solids. Percent solids is determined, as is conventional, by drying to constant weight at a temperature of about 105°C. It is also within the broader scope of the invention to heat treat sludge which has first been preconcentrated, as in a clarifier or even a filter such as a disc filter in which it may be pre-concentrated to, say, about a 15% solids content; at that concentration it is not pumpable with conventional pumping equipment but may be moved to and through the treatment zone by suitable solids handling equipment, e.g. a screw conveyor.

As shown in Example I of Ser. No. 159,441 and as described therein, filter cakes having solids contents in the range of about 35 to 40% are obtained as a result of the heat treatment. When such filter cakes are treated with concentrated sulfuric acid, there is obtained a zinc sulfate solution having a relatively high concentration of $Zn SO_4$ (e.g. about 30%) and very little of the calcium sulfate goes into solution, the proportion of $CaSO_4$ in the zinc sulfate solution being less than 0.2%, such as 1300 ppm.

As shown in Example I of Ser No. 159,441, the effects are dependent on the time and the temperature. Thus, when a steam temperature of 138°C. is employed, the percent solids in a filter cake is only 28% even after 240 minutes of treatment. with a steam temperature of 160°C., the time needed to attain a 28% solids filter cake is between 30 and 45 minutes; at 170° C. steam temperature, it is (by interpolation) a little more than 20 minutes; while at 178° C. steam temperature, it is obviously well below 10 minutes. As stated in Ser. No. 159,441, the minimum time of treatment is dictated by the limitations of conventional pressure systems which require time for injecting heat, treatment time, and time for relieving pressure. The data in said Example I shows that at suitable temperatures, above 170° C., the minimum time of treatment is not dictated by the requirements of the reaction itself. Thus it is clear that, by use of suitable special heat exchanges and coolers, one can reduce the residence time above 125° C. to periods of less than 5 minutes. One laboratory example of a short-period process is given below.

EXAMPLE IV

Untreated sludge, as described in Example III was placed in glass tubes about 2.5 mm. inner diameter, 4 mm. outer diameter, 6 cm. long, filled with sludge to about 3.5 cm. and sealed off at about 5 cm. length. The filled tubes were placed in the wells (6 mm. diameter, 8 cm. deep) of an aluminum block maintained at a temperature of 200° C.

In one experiment, one of the tubes was wrapped in aluminum foil and placed in the well for 3.0 minutes then quickly immersed in cold water. After standing vertically for 10 minutes a clear layer, about 8 mm. in depth appeared; such a layer did not develop in the unheated tube even after much longer standing.

In a second experiment, the tubes containing untreated sludge were placed (without any foil cover) in the wells for 4.0 minutes, then cooled in cold water within 20 seconds. A clear supernatant layer developed in 5 minutes. The tubes were then centrifuged to accelerate settling and the wet solids were subjected to X-ray analysis as in Example III with similar results.

As indicated in Examples I and II of Ser. No. 159,441, it is advantageous to cool the heat treated sludge somewhat before filtering it (or otherwise treating it to separate the solids from the liquid, e.g., by centrifuging). In this way, the solid separation step can be effected with equipment that need not be so resistant to the temperatures used for heat treatment. It is within the broader scope of the invention, however, to filter the material without coolng it, and to cool it thereafter.

In some cases (e.g. when the solids content of the sludge is quite low) the heat treated sludge separates rapidly (on standing at room temperature) to give a clear aqueous upper layer; in other cases it is found that such a sharp separation is not observed and, in fact, the formation of such clear layer occurs (at least initially) more rapidly in the sludge that has not been heat treated, and the upper layer from the heat treated sludge is cloudy.

The data given in Example I of Ser. No. 159,441, may be expressed in terms of the "room temperature filtration characteristic" of the sludge. The room temperature filtration characteristics may be conveniently determined in the following way:

The cooled sludge is filtered through filter paper (e.g., No. 40 Whatman filter paper) on a conventional Buchner funnel (e.g., of 4 inch diameter) while the sludge is at a temperature well below 100° C. (such as room temperature about 25° 149 C.), under the vacuum produced by a conventional laboratory aspirator (suction induced by flow of water through a venturi which, as is well known, provides about 26 – 27 inches of vacuum). In each case the amount of sludge placed in the Buchner funnel is such as to provide 4 grams of dry solids. The filtration is continued past the point at which the filter cake cracks and is stopped when no additional cracking is apparent. The cake is then analyzed for solids content by drying it in an oven at 105° C. The percent solids, based on the weight of the filter cake, is the "room temperature filtration characteristic."

The effect of temperature of steam treatment and of treatment time on the room temperature filtration characteristic is shown in the table in Example I of Ser. No. 159,441, in which it will be seen that this characteristic is increased by well over 50%, e.g. by 100%, 200% or more, and preferably to a value above 30, such as 35 or more.

Various changes and modifications may be made in practicing the invention without departing from the spirit and scope thereof and, therefore, the invention is not to be limited except as defined in the appended claims.

What is claimed is:

1. A process for improving the filtration characteristics of solids in a dilute aqueous slurry of hydrated zinc oxide which comprises elevating the temperature of said slurry to at least 257° F. under an elevated pressure sufficient to prevent essentially any loss of the water in the slurry and for a time sufficient to decrease the water of hydration content of the hydrated zinc oxide and then treating the slurry to recover filterable solids including zinc oxide therefrom.

2. The process of claim 1 wherein the dilute aqueous slurry of hydrated zinc oxide is neutralized waste liquor from a viscose process for manufacturing viscose rayon filaments said waste liquor containing zinc sulfate prior to neutralization.

3. The process of claim 2 wherein said waste liquor has been neutralized with lime [Ca(OH)$_2$].

4. The process of claim 2 wherein the recovered filterable solids are treated with aqueous sulfuric acid in an amount sufficient to convert substantially all of the zinc oxide to zinc sulfate.

5. The process of claim 4 wherein the zinc sulfate solution is filtered, ferrous ions in said solution are oxidized to ferric ions, the pH of the solution adjusted to precipitate ferric hydroxide and the ferric hydroxide is removed from the solution.

6. Process as in claim 1 in which the elevated temperature of the slurry is provided by injecting, into said slurry, steam supplied under a pressure of at least 125 p.s.i.g.

7. Process as in claim 6 in which said elevated temperature is about 325° to 350° F. and in which, after completing the step of elevating the slurry temperature and before step of treating the slurry to recover filterable solids, said slurry is cooled.

8. Process as in claim 6 wherein said dilute aqueous slurry is a sludge of a lime-neutralized waste liquor from a viscose process for manufacturing viscose rayon filaments, said sludge containing about 1 to about 10% solids and in which, after said step of elevating said temperature and before said step of treating said slurry to recover filterable solids, said slurry is cooled.

9. Process as in claim 1 wherein said dilute aqueous slurry is a sludge of a lime-neutralized waste liquor from a viscose process for manufacturing said viscose rayon filaments, said sludge containing about 1 to about 10% solids.

10. A process for treating neutralized viscose process waste liquor which is a dilute aqueous slurry of hydrated zinc oxide containing calcium sulfate which on vacuum filtration yields a filter cake containing zinc oxide and water, said process comprising raising the temperature of said slurry to at least 257° F. under an elevated pressure sufficient to prevent essentially any loss of the water in the slurry and for a time sufficient to raise the solids content and decrease the water content of the resulting zinc oxide-containing filter cake on filtration of the slurry under vacuum after release of the pressure 11. A process as in claim 10 in which the slurry temperature is raised by injecting steam at a temperature of at least 320° F. into said slurry and the time of treatment is such that said solids content is more than doubled.

12. A process as in claim 11 in which said steam temperature is at least 338° F., the time of treatment is such as to raise said solids content to at least 26.5%, and the process includes the step of then treating the slurry to recover filterable solids including zinc oxide therefrom.

13. A process as in claim 12 in which the time of treatment is such as to raise said solids content to about 35%.

14. A process as in claim 10 in which said time is sufficient to increase the room temperature filtration characteristic of said slurry to a value above 30.

15. A process as in claim 10 in which said time is at least 5 minutes.

* * * * *

UNITED STATES PATENT OFFICE
CERTIFICATE OF CORRECTION

PATENT NO. : 3,985,858
DATED : October 12, 1976
INVENTOR(S) : John H. Cosgrove

It is certified that error appears in the above-identified patent and that said Letters Patent are hereby corrected as shown below:

In column 4, line 29, that portion reading "rayon factor" should read ---rayon factory---.

In column 6, line 11, that portion reading "heat exchanges" should read ---heat exchangers---.

In column 6, line 65, delete "149" as superfluous.

Signed and Sealed this

First Day of March 1977

[SEAL]

Attest:

RUTH C. MASON
Attesting Officer

C. MARSHALL DANN
Commissioner of Patents and Trademarks